United States Patent [19]
Anderson

[11] Patent Number: 6,119,651
[45] Date of Patent: Sep. 19, 2000

[54] HYDROGEN POWERED VEHICLE, INTERNAL COMBUSTION ENGINE, AND SPARK PLUG FOR USE IN SAME

[75] Inventor: Herman P. Anderson, Brentwood, Tenn.

[73] Assignee: Herman P. Anderson Technologies, LLP, Brentwood, Tenn.

[21] Appl. No.: 09/220,286

[22] Filed: Dec. 23, 1998

Related U.S. Application Data

[63] Continuation-in-part of application No. 08/905,862, Aug. 4, 1997, Pat. No. 5,852,993.

[51] Int. Cl.[7] .................................................. F02M 57/06
[52] U.S. Cl. ................... 123/297; 123/635; 123/DIG. 12
[58] Field of Search .............................. 123/3, DIG. 12, 123/527, 297, 636, 637, 635, 169 EL; 313/120

[56] References Cited

U.S. PATENT DOCUMENTS

| | | | |
|---|---|---|---|
| 2,208,030 | 7/1940 | Holmes | 123/169 EL |
| 3,165,099 | 1/1965 | Vanderpoel | 123/637 |
| 3,926,169 | 12/1975 | Leshner et al. | 123/297 |
| 3,980,061 | 9/1976 | McAlister | 123/297 |
| 4,164,912 | 8/1979 | Beyler | 123/26 |
| 4,186,712 | 2/1980 | Fitzner et al. | 123/633 |
| 4,319,552 | 3/1982 | Sauer et al. | 123/297 |
| 4,343,272 | 8/1982 | Buck | 123/297 |
| 4,383,198 | 5/1983 | Hosking | 313/120 |
| 4,448,160 | 5/1984 | Vosper | 123/297 |
| 4,820,957 | 4/1989 | Zivkovich | 315/209 T |
| 5,852,993 | 12/1998 | Anderson | 123/297 |

FOREIGN PATENT DOCUMENTS 686943 8/1930 France ................................. 123/297

*Primary Examiner*—Noah P. Kamen
*Attorney, Agent, or Firm*—Lucian Wayne Beavers Waddey & Patterson

[57] ABSTRACT

The internal combustion engine fuel system described includes a structure for mixing the alternative fuel, preferably hydrogen, with oxygen in ambient air to stratify the fuel. The system includes an adapter, and the adapter includes a housing mounted between spark plug and cylinder of the internal combustion engine. A plug is placed within the housing. The plug has ridges or grooves on its outer surface that act as mixing structures. Thus, when hydrogen is introduced into the adapter housing it is mixed with ambient oxygen within the chamber as it flows over the plug. The mixing structures in the housing creates a vortexing action as the hydrogen flows over the plug and towards the cylinder of the engine. An electrode protrudes from the plug towards the cylinder. The electrode is preferably platinum and generates the necessary spark to create combustion of the hydrogen/air mixture adjacent to the cylinder to thereby power the cylinder in the engine. A platinum electrode is preferably used because it enhances a catalytic conversion of combustion by-products to more environmentally compatible products. The present invention also teaches a spark plug producing a hotter spark for a hydrogen fuel system. Also taught is a hydrogen powered vehicle with reduced emissions by producing a spark during the power stroke and the exhaust stroke. Methods for reducing exhaust pollution are also taught. Methods of reducing exhaust pollution by generating a plasma are taught as well.

13 Claims, 12 Drawing Sheets

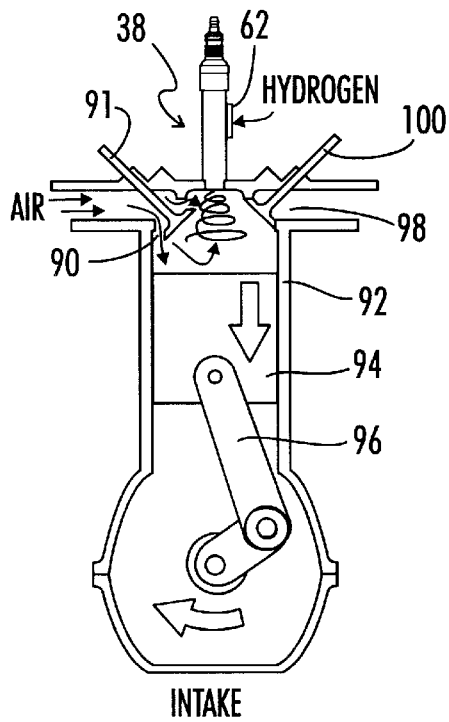
FIG. 5A INTAKE
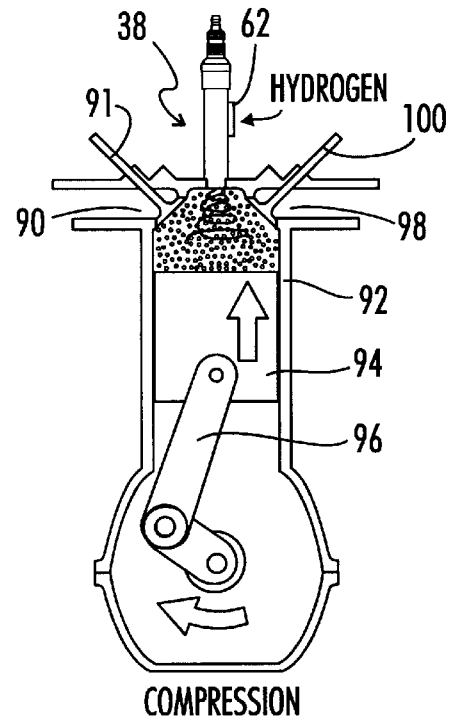
FIG. 5B COMPRESSION
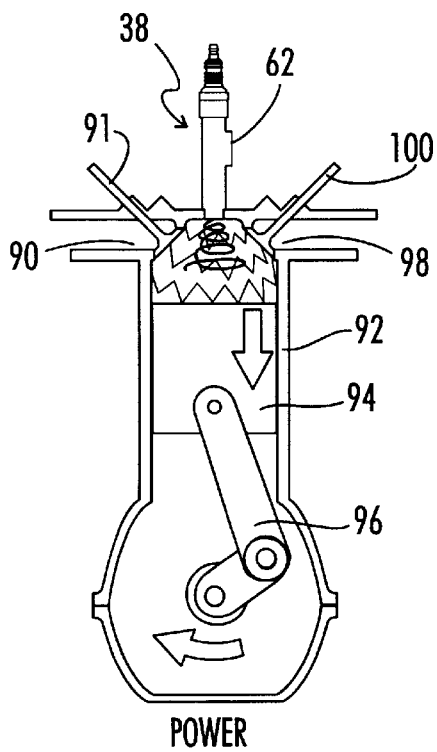
FIG. 5C POWER
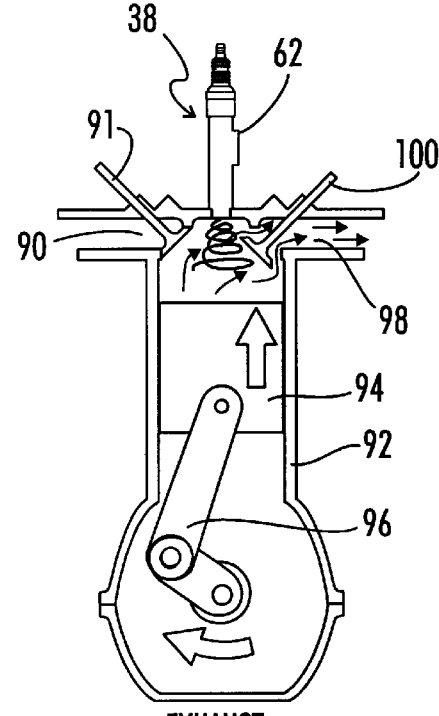
FIG. 5D EXHAUST

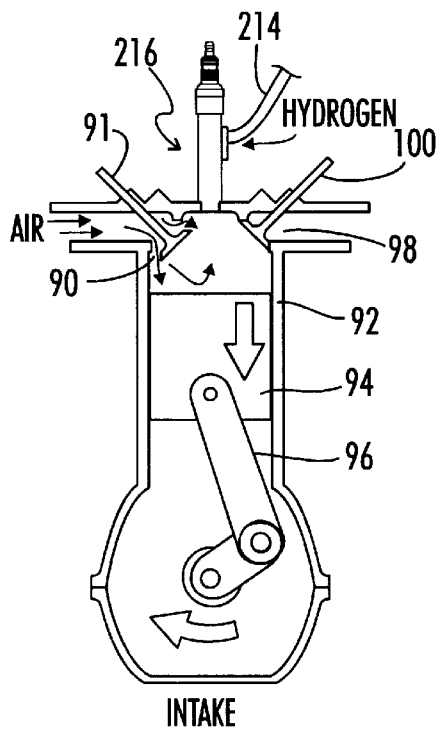
FIG. 8 INTAKE
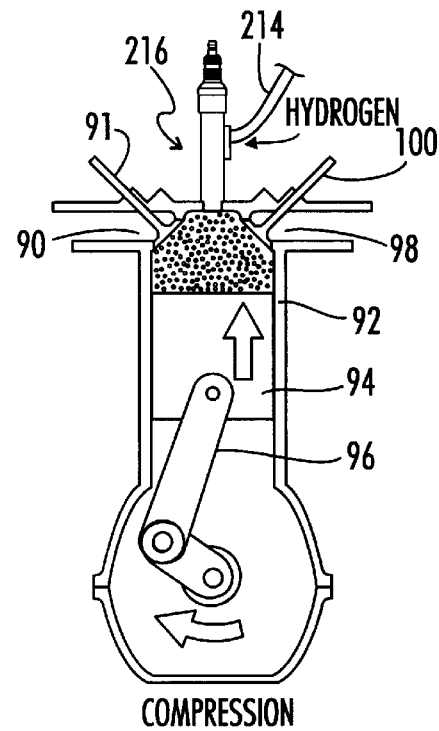
FIG. 9 COMPRESSION
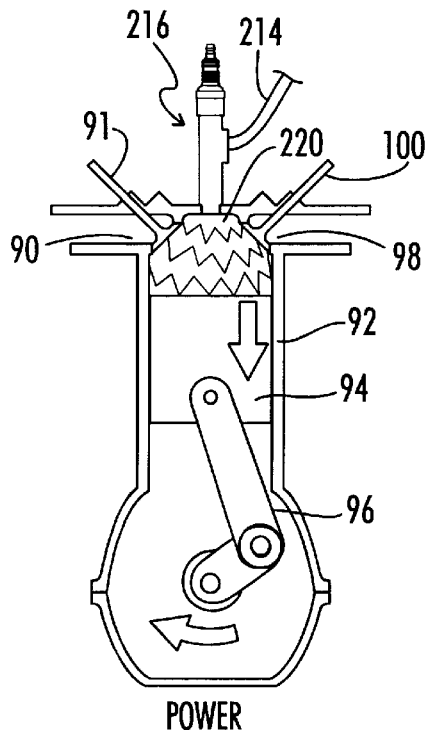
FIG. 10 POWER
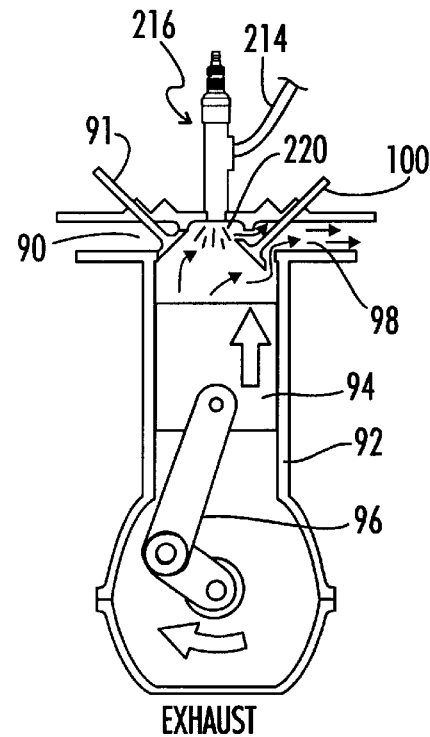
FIG. 11 EXHAUST

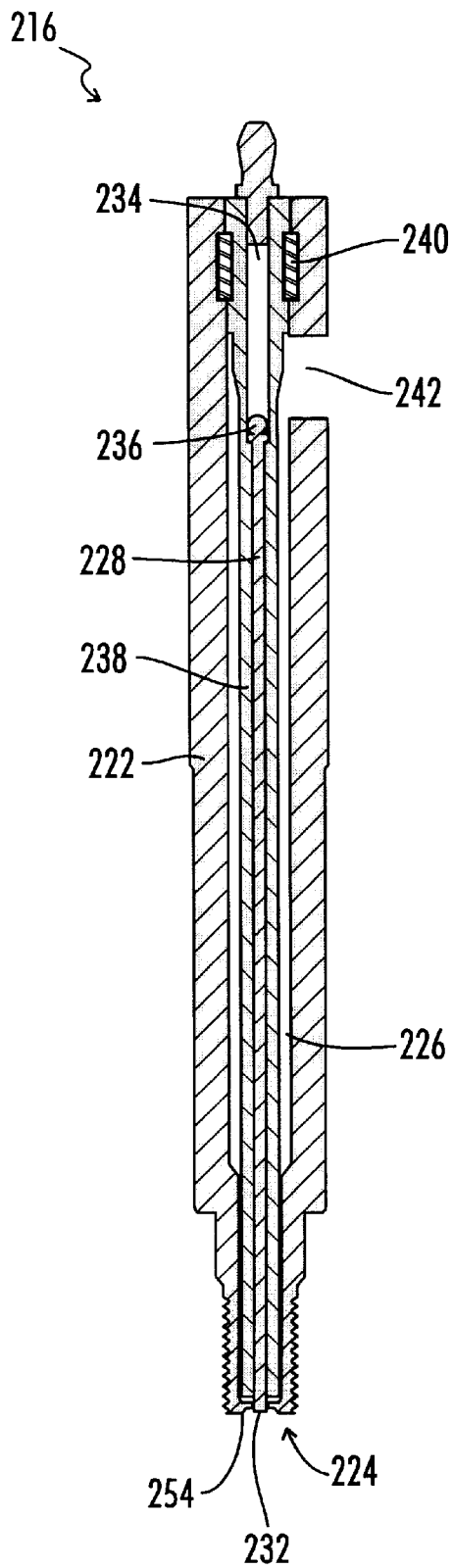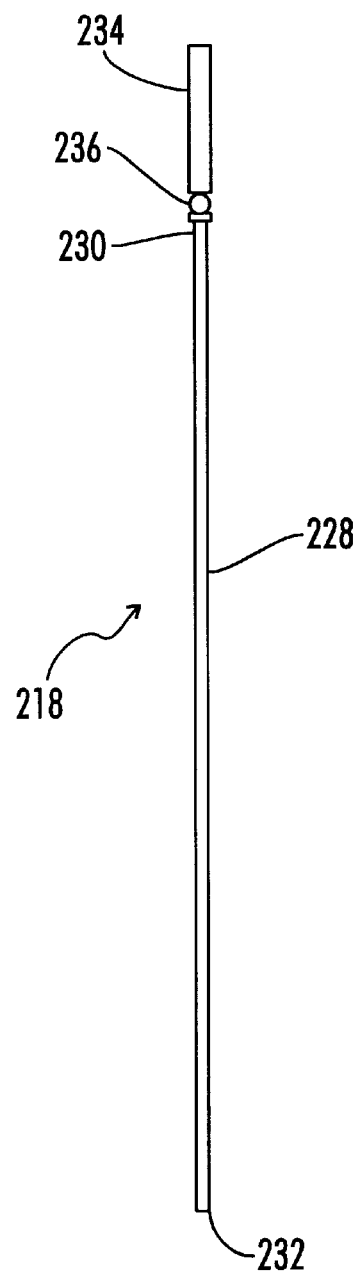
FIG. 15
FIG. 16

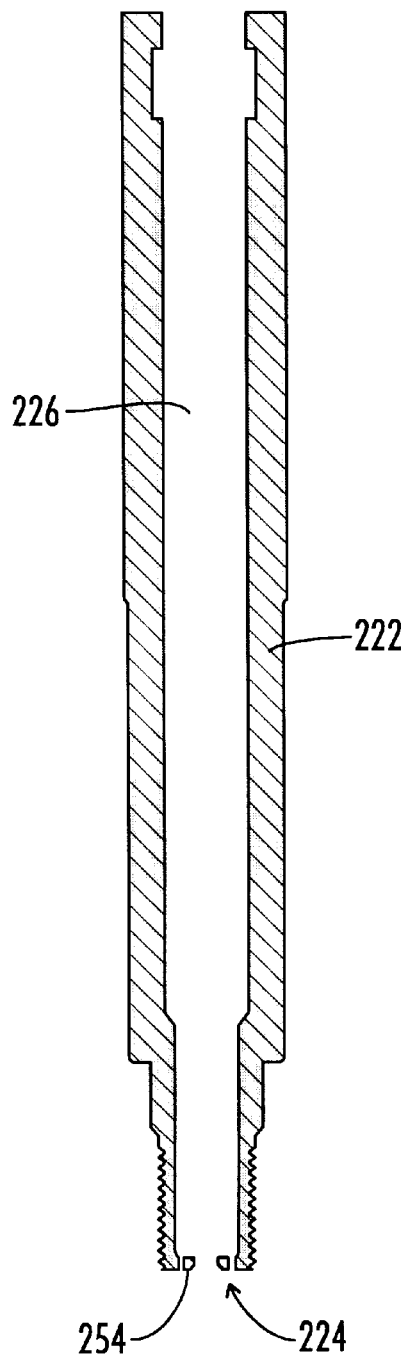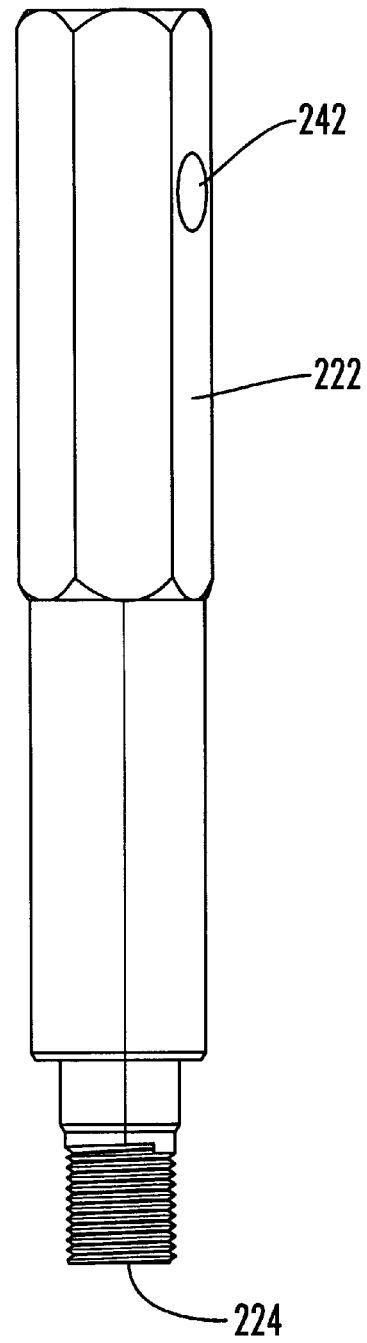
*FIG. 17*  *FIG. 18*

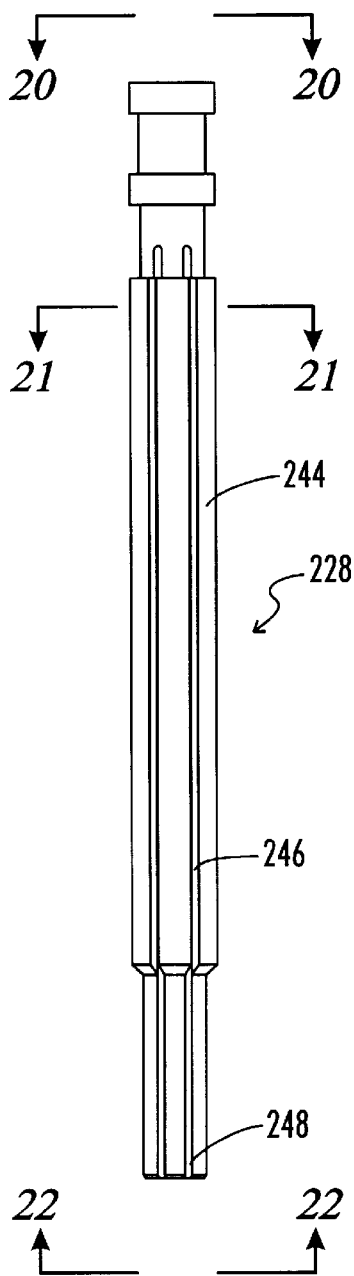
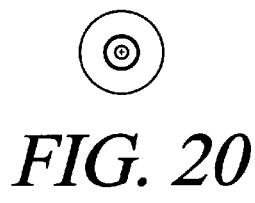
FIG. 20
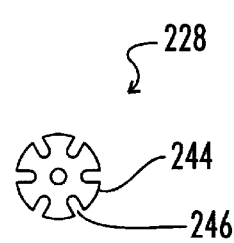
FIG. 21
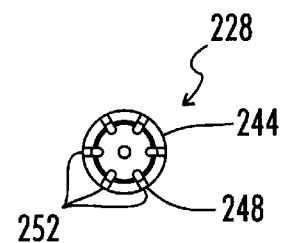
FIG. 22
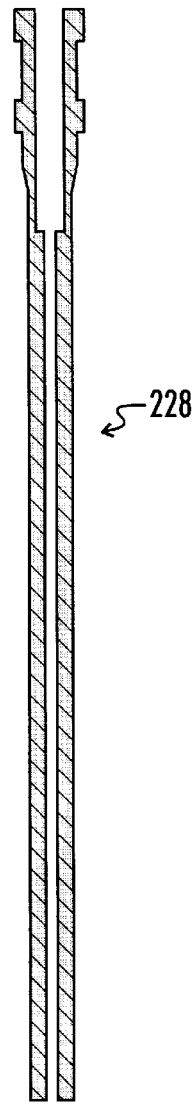
FIG. 23
FIG. 19

HYDROGEN POWERED VEHICLE, INTERNAL COMBUSTION ENGINE, AND SPARK PLUG FOR USE IN SAME

This application is a continuation-in-part of U.S. patent application Ser. No. 08/905,862 filed Aug. 4, 1997 by Herman P. Anderson, entitled "Fuel System For Internal Combustion System And Adapter For Use In Same", now U.S. Pat. No. 5,852,993. U.S. patent application Ser. No. 08/905,862 is hereby incorporated herein by reference.

BACKGROUND OF THE INVENTION

The present invention relates generally to a fuel system for internal combustion engines that enables the invention to utilize alternative fuels; and, more particularly to an improved fuel system for an internal combustion engine and an adapter and spark plug for use in same.

The problems of air pollution caused by automobiles, lawn mowers and other vehicles that have internal combustion engines powered by gasoline is well documented. This problem is particularly described in an article in the San Diego Union Tribune, Wednesday, Sep. 25, 1996 and in Popular Science, August 1996. Indeed, under the Clean Air Act, in the next few years cars that do not run on standard fossil fuels like gasoline will be required in several states. Currently, there are no vehicles available to meet this need.

Thus, it will be appreciated by those skilled in the art that there has been a push to seek other fuels for use in internal combustion engines. These fuels include methane, propane and gasohol.

Hydrogen has also been characterized as a promising fuel source. See Department of Energy publication entitled "Hydrogen Fuel", printed in 1978, U.S. Government Printing Office, U.S. Department of Energy, Office of Public Affairs, Washington, DC 20585. Particularly, the graph presented in FIG. 6, which is copied from this publication, shows the potential for hydrogen in BTUs/Lb. However, the mass energy density for hydrogen is low; and thus, hydrogen needs to be compressed before its energy potential can be realized. Hydrogen is a "dry fuel" that is more difficult to ignite than "wet fuels." It becomes more difficult to ignite when it is cooled. However, cooling is preferred in most systems to avoid premature ignition of the fuel. Other systems deliver the hydrogen under pressure to prevent ignition in the supply line, which is a form of pre-ignition. No prior art fuel system has been able to capture the energy of hydrogen.

Several fuel systems for use with hydrogen have been proposed. Examples are described in U.S. Pat. Nos. 4,167,919; 4,253,428; 4,016,836; 4,178,882; 5,222,993; 5,085,176; and 5,085,176. The problem with these prior art fuel systems is they cannot take advantage of the alternative fuels to generate sufficient power from the fuels to drive an internal combustion engine for use in a lawn mower, automobile or other vehicle. As noted above, this is a particular problem when hydrogen is used as a fuel. Additionally, the prior art systems do not address the problem of back fire, i.e. undesired explosion of the fuel in the cylinder during the exhaust stroke of the internal combustion engine.

Premature ignition or backfire is often a problem with hydrogen fueled systems. U.S. Pat. No. 4,383,198 (Hosking) teaches a fuel injection spark plug with a pre-cooling chamber to avoid premature ignition indentination of a gaseous fuel supplied to the spark plug. U.S. Pat. No. 4,383,198, Hosking, entitled "Fuel Injection Spark Plug", issued May 10, 1983, is hereby incorporated herein by reference. However, cooling hydrogen makes it more difficult to ignite. This is because hydrogen is a dry fuel whereas gas is generally considered a wet fuel. Thus to reduce fuel pollution one prefers to utilize a fuel such as hydrogen and ignite it with a hotter spark.

One patent discussing very high energy (VHE) ignition systems is U.S. Pat. No. 5,207,208 issued to Ward, entitled "Integrated Convertor High Power CD Ignition", issued May 4, 1993. U.S. Pat. No. 5,207,208 is hereby incorporated herein by reference. Pat. '208 teaches very high energy ignition systems, for instance on the order of 36K volts. It teaches voltage doubling utilizing pulsating sparks of peak current on the order of two amps. While 36K volts may at times be adequate, it is preferable to achieve a higher voltage in the ignition chamber when using hydrogen.

It is known in the art to use a direct ignition system, also referred to as a distributorless ignition system, to increase the spark plug voltage. Such direct ignition systems use a "waste spark" method of spark distribution. Each cylinder is paired with its opposing cylinder in the firing order (1-4, 2-3, on a four cylinder, 1-4, 2-5, 3-6 on a V6) so that one cylinder on compression fires simultaneously with its opposing cylinder on exhaust stroke. Since the cylinder on exhaust stroke requires very little of the available voltage to fire its plug, most of the voltage is used to fire the cylinder on the compression stroke.

U.S. Pat. No. 4,462,380 discusses a distributorless ignition system. U.S. Pat. No. 4,462,380 entitled "Enhanced Spark Energy Distributorless Ignition System" issued Jul. 31, 1984 by Asik is hereby incorporated herein by reference. Pat. '380 teaches a distributorless ignition system of an internal combustion engine which has a supplementary spark energy module to increase spark energy. Each high voltage terminal is connected to a single spark plug and each ignition coil primary is alternately energized and quickly de-energized, producing opposite polarity ignition voltages at each coil terminal. As a result, pairs of spark plugs are alternately fired, with each firing pair occurring in a compression or exhaust stroke and thereby providing the proper ignition to the engine. Asik asserts that firing a spark plug does not affect engine performance or emissions. As taught by the instant invention this is incorrect for hydrogen fuels when the exhaust is sparked at a sufficient voltage.

U.S. Pat. No. 5,146,882 (Brinkman) teaches use of specific wet fuel mixtures in conjunction with direct ignition systems (D.I.S.). It teaches that technical breakdown voltages for typical spark plugs are on the order of 15–20 kV and DIS typically yield between 30 kV–40 kV. U.S. Pat. No. 5,146,882, entitled "Method And Apparatus For Cold Starting A Spark Ignited Internal Combustion Engine Fueled With An Alcohol-Based Fuel Mixture", by Brinkman, et al., issued Sep. 15, 1992, is hereby incorporated herein by reference. The previously referenced prior art discusses alternate fuels and fuel systems but does not teach a method of achieving a sufficient voltage with a hydrogen system.

What is needed, then, is a fuel system for an internal combustion engine that provides a way to generate sufficient power from the alternative fuels and that reduces backfire problems. Such a system is lacking in the prior art. Also lacking in prior art is a system utilizing alternate fuels with reduced pollution capabilities. Also lacking is a way of generating sufficient voltage spark to ignite the alternate fuel.

The following U.S. Patents discuss spark plugs designed for gas internal combustion engines to reduce radio frequency noise and interference. U.S. Pat. No. 4,224,554, entitled "Spark Plug Having A Low Noise Lever" issued to Nishio et al., Sep. 23, 1980 is hereby incorporated herein by reference. U.S. Pat. No. 4,029,990 entitled "Spark Plug Construction" issued to Nagy et al., Jun. 14, 1977 is hereby incorporated herein by reference.

SUMMARY OF THE INVENTION

It is an object of this invention to provide an improved fuel system for use with alternative fuels.

It is a further object of this invention to provide an improved fuel system for use particularly with hydrogen, and particularly to enhance the mass energy density of hydrogen.

It is an object to provide a hotter sparking plug to ignite the fuel.

It is still a further object of this invention to provide an adapter for use in a fuel system for an internal combustion engine that enhances the power obtained from the alternative fuels.

It is still a further object of this invention to provide an improved fuel system for an internal combustion engine that does not present the environmental hazards of a standard gasoline engine by providing reduced or zero emission of environmentally harmful gases.

It is yet a further object of this invention to provide an improved fuel system for an internal combustion engine that can use an alternative fuel and can use gasoline to facilitate the transition from gasoline to alternative fuels.

It is yet a further object of this invention to provide an improved fuel system for an internal combustion engine that reduces backfire problems.

It is yet a further object of this invention to provide an improved fuel system for an internal combustion engine that reduces backfire problems by cooling the electrode in the spark plug with the hydrogen gas fuel.

It is an object to reduce backfire by providing hydrogen at a sufficient pressure to reduce backfire and igniting it with a hotter spark (i.e. a higher voltage).

It is still a further object of this invention to provide an adapter for use in a fuel system for an internal combustion engine that enhances the power obtained from the alternative fuels.

It is a further object to generate a plasma field in a cylinder to burn residual exhaust and reduce emissions.

It is yet a further object of this invention to provide a direct injection fuel system wherein fuel is injected directly into the cylinder.

It is an object to provide a "2-fire" direct injection system, wherein the fuel is ignited during the power stroke and the exhaust stroke.

It is yet a further object of this invention to provide a way to convert the standard induction fuel system of a lawnmower to a direct injection fuel system wherein fuel is injected directly into the cylinder.

It is yet a further object of this invention to provide a way to convert the indirect injection fuel system of an automobile to a direct injection fuel system wherein fuel is injected directly into the cylinder.

The internal combustion engine fuel system of this invention includes a structure for mixing the alternative fuel, preferably hydrogen, with oxygen in ambient air to stratify the fuel. The term "alternative fuels" is known in the art and is meant to refer to fuels other than conventional gasoline.

The invention in one embodiment comprises an adapter, the adapter including a housing mounted between spark plug and cylinder of the internal combustion engine. A plug is placed within the housing. The plug has ridges or grooves on its outer surface that act as mixing structures. Thus, when hydrogen is introduced into the adapter housing it is mixed with ambient oxygen within the chamber as it flows over the plug. The mixing structures on the plug create a vortexing action as the hydrogen flows over the plug and towards the cylinder of the engine.

An electrode protrudes from the plug towards the cylinder. The electrode is preferably platinum and generates the necessary spark to create combustion of the hydrogen/air mixture adjacent to the cylinder to thereby power the cylinder in the engine. A platinum electrode is preferably used because it enhances a catalytic conversion of combustion by-products to more environmentally compatible products.

Thus, the combination of the compression action generated by the conventional piston and push rod within the cylinder of the engine in conjunction with the hydrogen/air mixing structure that vortexes the hydrogen/air create compressed hydrogen that is mixed with a combustion facilitator, i.e. oxygen in the ambient air to enable the system of this invention to capture the abundant energy found in hydrogen fuel.

The enhanced mixing capabilities of this invention is also adaptable for use with other alternative fuels such as natural gas, alcohol, propane and the like.

One embodiment of the present invention is for a hydrogen powered vehicle including an internal combustion engine operably connected to power the vehicle and adapted to connect to a hydrogen supply line. The internal combustion engine comprises a cylinder operably connected to the supply line; a piston operably disposed in the cylinder; and a spark plug having an electrode assembly in operable sparking communication with the cylinder, wherein the spark plug is capable of producing a spark of at least 45 kV.

Preferably the spark plug comprises a housing having a sparking end and a hollow chamber containing the electrode assembly. The electrode assembly comprises an electrode having a connector end and a sparking end, wherein the sparking end is positioned adjacent to the housing sparking end. The electrode assembly preferably comprises a coil electrically connected to the electrode connector.

Preferably the housing comprises a fuel inlet port in fluid communication with the supply line, and an insulator surrounding the electrode assembly, wherein the insulator is positioned in the hollow chamber. Preferably the insulator comprises an outer surface defining a first fuel channel having a first respective fuel exit port, wherein the first fuel channel is in fluid communication with the fuel inlet port and the fuel exit port exits into the cylinder.

The present invention also includes a method of operating an internal combustion engine comprising supplying hydrogen fuel to the engine and creating a spark in the cylinder during the power stroke and the exhaust stroke, wherein the spark created during the power stroke is at least 45 kV. In one embodiment the spark is at least 70 kV. In certain embodiments the method comprises generating plasma during the exhaust stroke. The exhaust fuel converts to an exhaust emission and coalesces with the plasma, thereby reducing fuel pollution.

Accordingly, it is an object in the invention to provide a spark plug producing a sufficiently hot spark to ignite hydrogen fuel, including cooled hydrogen fuel.

Another object of the present invention is to provide a device for reducing fuel exhaust emissions.

Another object of the present invention is to provide a cleaner burning engine.

Another object is to provide a spark plug for reducing emissions.

Another object of the present invention is to provide a device functional with dry fuels. Use of the term hydrogen, as discussed herein, is intended to encompass such dry fuels. However the term as used excludes such wet fuels as gas and alcohol.

Another object of the present invention is to provide an integrated fuel system adapted to provide these and objectives.

Other objects and advantages of the present invention will be apparent to those of skill in the art by reference to the teachings disclosed herein, including the attached drawings, detailed description of exemplary embodiments, and claims.

BRIEF DESCRIPTION OF THE DRAWINGS

FIGS. 5A–5D are a schematic of the 4 cycle combustion in an internal combustion engine including the adapter of this invention.

FIG. 8 depicts an intake stroke of a cylinder connected to a hydrogen source.

FIG. 9 depicts a compression stroke of a cylinder connected to a hydrogen source.

FIG. 10 depicts a power stroke of a cylinder connected to a hydrogen source. The spark plug shown in FIG. 10 is depicted sparking.

FIG. 11 depicts a cylinder in an exhaust stroke connected to a hydrogen source, wherein the spark plug is sparking during the exhaust stroke.

FIG. 15 depicts an elevated side section view of the spark plug shown in FIG. 12.

FIG. 16 shows a electrode assembly which is disposed in the hollow chamber depicted in FIG. 15.

FIG. 17 shows a section view of the spark plug housing clearly showing the hollow chamber and a torridal ground electrode.

FIG. 18 depicts an elevated side view of the spark plug housing and a fuel inlet port.

FIG. 19 depicts an insulator comprising fuel channels and fuel exit ports.

FIG. 20 is a top plan view of the insulator shown in FIG. 19 viewed in the direction of view line 20—20.

FIG. 21 is a cross section view of the insulator shown in FIG. 19 along section line 21—21.

FIG. 22 is a cross section view of the insulator shown in FIG. 19 viewed in the direction of view line 22—22.

FIG. 23 is an elevated section view of the insulator shown in FIG. 19.

DESCRIPTION OF THE PREFERRED EMBODIMENT

Figure 1:
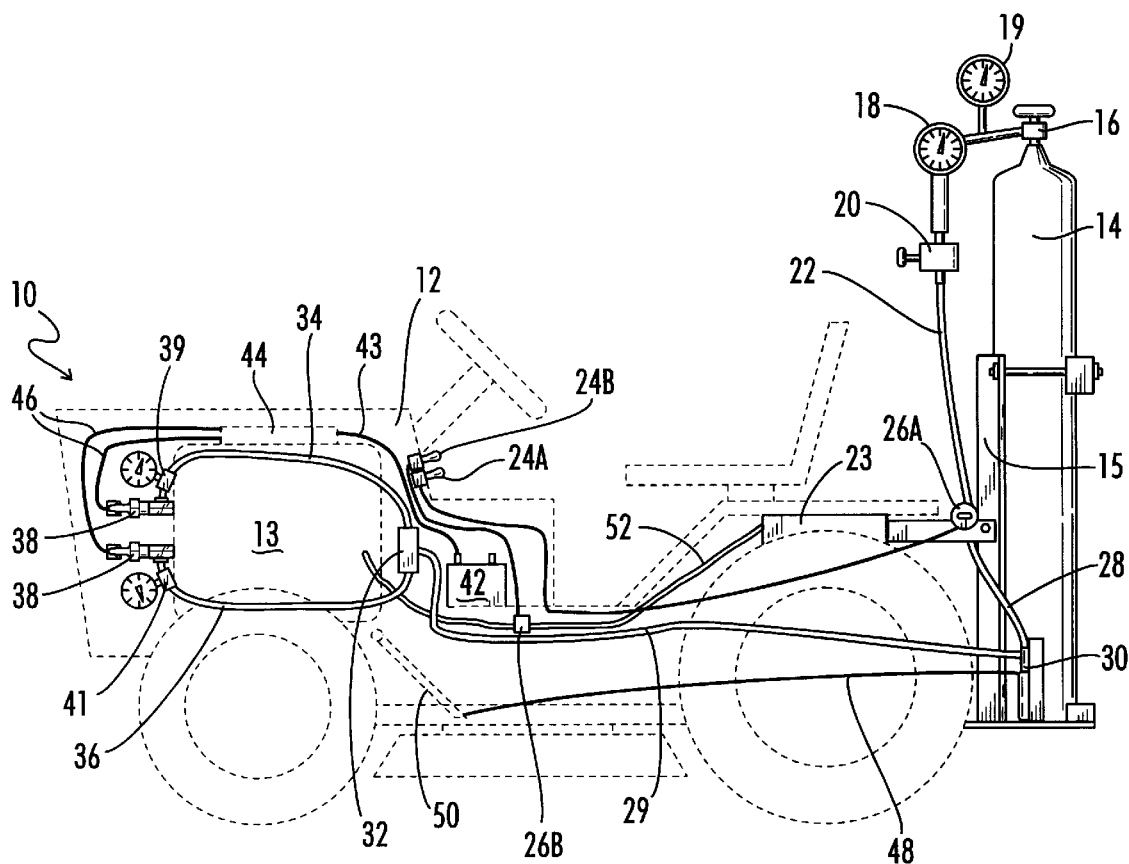
FIG. 1 is a plan view of the fuel system of this invention with a lawn mower shown in phantom.

Referring now to the drawings, wherein like reference numerals refer to like parts throughout, the fuel system is referred to generally at 10. The fuel system of this invention is contemplated for use with an internal combustion power system, such as an internal combustion engine or such as a home heating system. Fuel system 10 is portrayed in this case as connected to a standard lawn mower. The lawn mower is shown in phantom at 12 in FIG. 1. The lawn mower is a conventional lawn mower as can be purchased from a company such as Murray of Ohio. The internal combustion engine in the lawn mower is a standard 4-cycle engine with two cylinders and develops 18 horsepower. A suitable example can be purchased from Briggs & Stratton, Milwaukee, Wis. 53201.

Referring particularly to FIG. 1, system 10 includes fuel tank 14 that is mounted to lawn mower 12 via mounting assembly 15. In the preferred embodiment, fuel tank 14 includes hydrogen gas. Accordingly, for the purposes of the foregoing detailed description, hydrogen gas will be described.

A line 22 begins at fuel tank 14 and proceeds to back-flow valve 16. Back-flow valve 16 is a standard valve and is available from AirCo Gases Company, 575 Mountain Avenue, Murray Hill, N.J. 07974, part no. WCS CV-4M. PSI tank gauge 19 is inserted in line 22 between back-flow valve 16 and flow pressure gauge 18. PSI tank gauge 19 is available from AirCo Gases Company also, part no. WCS CV5M, and serves as an indicator of fuel remaining in the tank 14. Flow pressure gauge 18 is used to monitor the flow of the hydrogen in pressure units. The flow is started using valve 16. The optimal flow pressure is 25 pounds of flow pressure from the tank 14 to the cylinder of the engine.

The flow of hydrogen is regulated via valve 20 that is part of gauge 18. Thus, when valve 20 is opened, hydrogen proceeds through line section 22 to hydrogen flow solenoid 26A. The user can access the hydrogen fuel by flipping hydrogen flow switch 24A into the "on" mode so that hydrogen gas in line 22 can proceed through hydrogen flow solenoid 26A and into line section 28.

Throttle 30 regulates the flow of hydrogen from line section 28 into line section 29 and ultimately, to engine 13. Throttle 30 is connected to throttle pedal 50 via includes throttle cable 48. Throttle pedal 50 also operates the butterfly valves in the carburetor in engine 13 in a conventional manner.

As an option, the throttle can be controlled electronically by a digital fuel controller product. Such a product is commercially available from Autotronic Controls Corp., 1490 Henry Brennan Drive, El Paso, Tex. 79936.

Line portion 29 proceeds through splitter 32 and is split into upper line 34 and lower line 36. Lines 34 and 36 proceed to adapters 38. Additional back-flow prevention valves 39 and 41 are mounted between lines 34 and 36 and adapters 38. Braided Teflon® is the preferred material for the fuel lines of the system.

Battery 42 is connected via battery cable 43 to magneto 44. Magneto 44 then controls the current through spark plug lines 46 to adapters 38 in a conventional manner. Thus, the regulation of the spark that ignites the fuel in the cylinder of engine 13 is conventional. Additionally, the intake of air into the engine 13 is accomplished through the standard carburetor system of engine 13. In a car, the sparking of the spark plugs can be controlled by the standard distributor/battery ignition system.

A second solenoid 26B controls the flow of gasoline from tank 23 through gasoline line 52. Solenoid 26B is controlled by switch 24B. Throttle 30 is connected to gasoline line 52 and can also be used to control the flow of gasoline to engine 13. Thus, this invention can be used with both an alternative fuel and gasoline.

Figure 2:
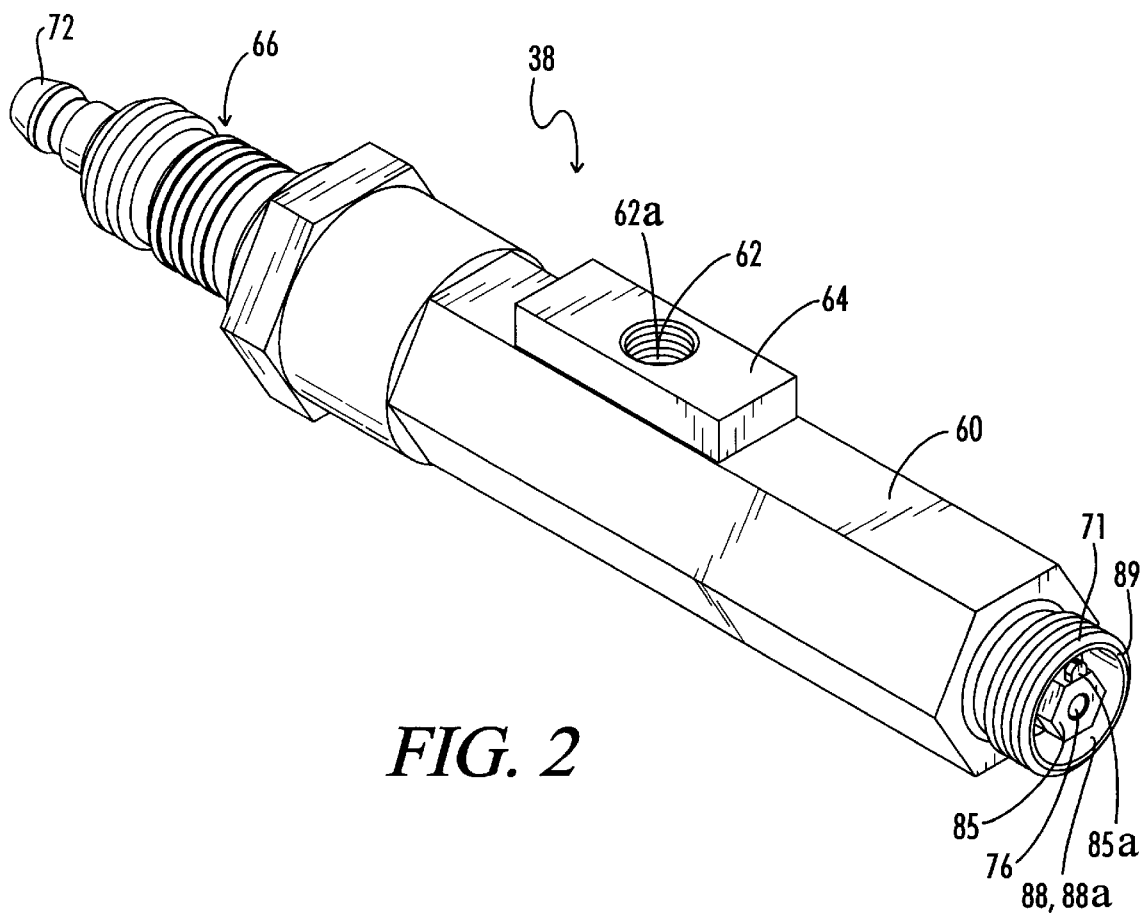
FIG. 2 is a perspective view of the adapter of the fuel system of this invention.
Figure 3:
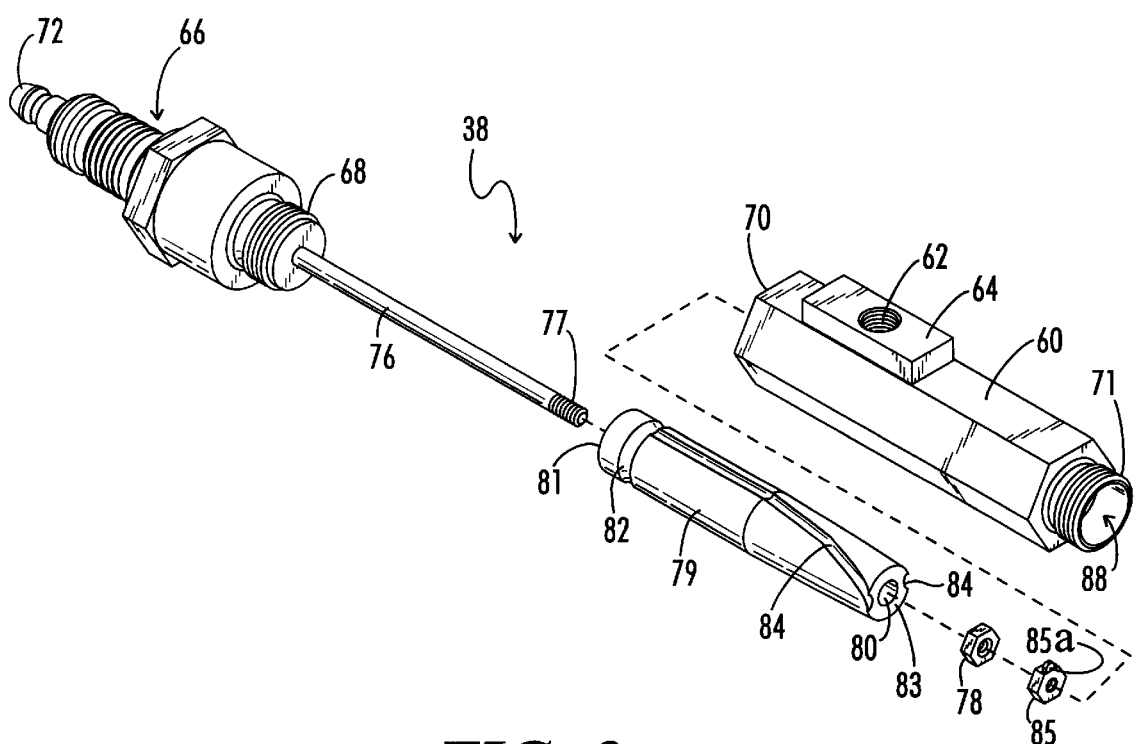
FIG. 3 is an exploded perspective view of the adapter of the fuel system of this invention.
Figure 4:
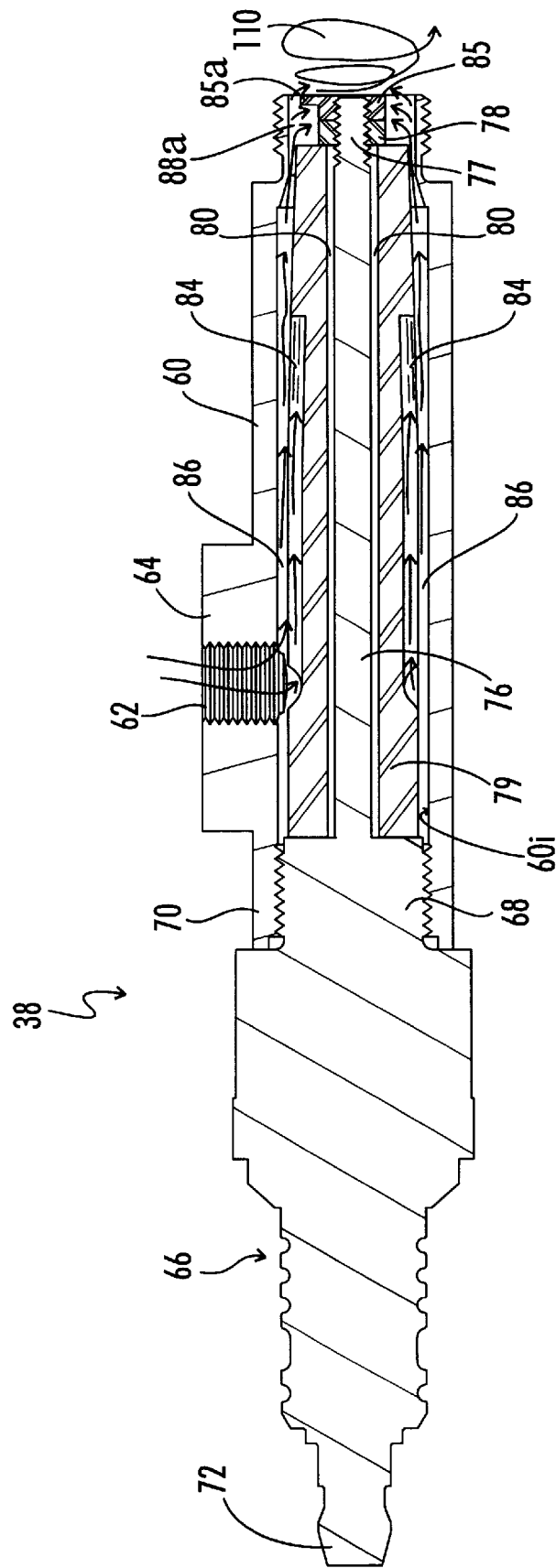
FIG. 4 is a cross-sectional view of the adapter of the fuel system of this invention.
Figure 6:
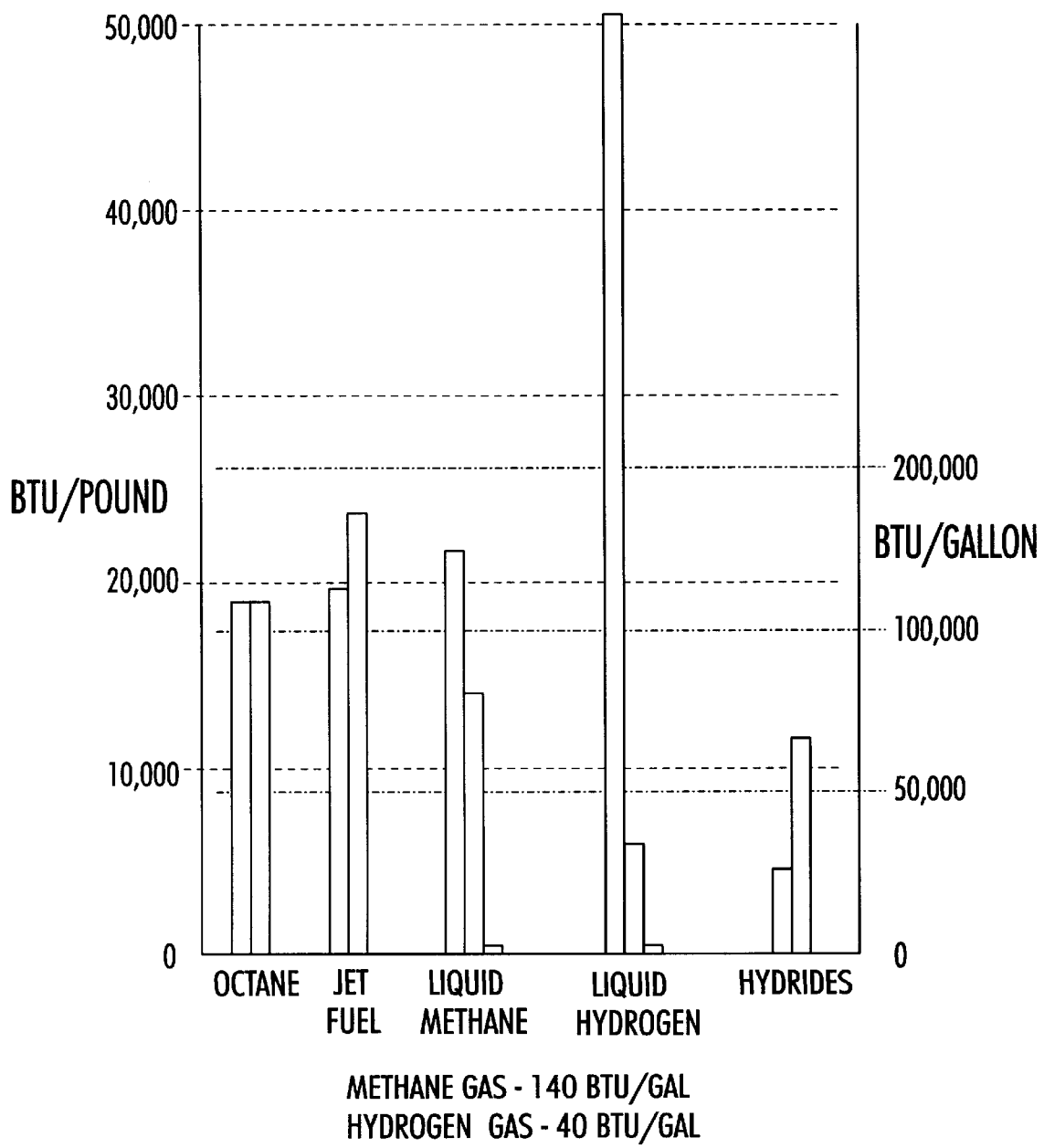
FIG. 6 is a graph which shows the energy potential for hydrogen in BTUs/Lb.

Referring now to FIGS. 2, 3 and 4, the adapter 38 of this invention is shown in more detail. Adapter 38 includes housing 60. A threaded port 62 is formed into housing 60 through port block 64. Hydrogen lines are threadably connected to the adapter 38 via port 62. Port 62 is also referred to as an entrance port. The entrance port has an entrance area 62a.

Adapter 38 also includes spark plug 66 which is effectively a standard spark plug except for the modification to the electrode as described below. Spark plug 66 includes a threaded end 68 which is threadably received in the threaded upper end 70 of housing 60. Spark plug wires 46 (as seen in FIG. 1) are connected to connector end 72 of spark plug base 66.

Electrode 76 protrudes from spark plug 66 and is of a length sufficient so that the threaded tip 77 (best seen in FIGS. 3 and 4) of the electrode 76 is proximate to the cylinder of the internal combustion engine when the adapter 38 is mounted. In one embodiment the electrode 76 is coterminus with an exit port 88 of the adapter 38. This most clearly is shown in FIG. 4. Electrode 76 is preferably platinum to enhance catalysis of combustion by-products, as will be more fully discussed below.

Adapter 38 also includes plug 79. Plug 79 includes an axial internal void space 80. Thus, plug 79 fits over electrode 76 via internal void space 80. Plug 79 preferably comprises a ceramic material that acts as a good insulator. A suitable source for ceramic plug 79 is AM/PRO Machinery, Inc. 134 Church Street, Plain City, Ohio 43064-1321.

An important aspect of this invention is found on the external surface of plug 79. An annular groove 82 is formed on the surface of plug 79 near its distal end 81 so as to be proximal to the port 62 where hydrogen enters housing 60. Two stratifying grooves 84 proceed along the surface of plug 79 until they reach its distal end 83. It is these mixing structures, i.e. annual groove 82 and stratifying grooves 84, that facilitate the improved power generation from alternative fuels as provided by this invention. It will be apparent to those skilled in the analogous arts that mixing structure may be formed in the inner surface of the adapter housing 60.

Alternatively a combination of vortex producing structures is integral with both the plug 79 and adapter housing 60. Also any conventional vortex producing means should be sufficient, per se, are not required.

On threaded tip 77 of electrode 76, there are mounted a spacer nut 78 and a spark gap nut 85. As best seen in FIG. 2, the spark gap nut 85 includes a protrusion 85a that provides the spark gap between electrode 76 and periphery 89 of the exit port 88 of housing 60. The exit port 88 includes an exit area 88a. Preferably, the exit area 88a is no larger than the entrance area 62a, though this is not critical. Preferably, the spark gap nut 85 is brass and the preferred spark gap distance is 25/1000 of an inch. Of course, the electrode may be coterminus with the plug distal end 83.

As best seen in FIG. 4, where arrows represent gas flow, hydrogen gas flows into chamber 60 via port 62. The hydrogen gas cools electrode 76, which facilitates combustion. Stratifying grooves 84, preferably there are two, act to mix the hydrogen that is flowing into housing 60 with ambient air therein. Though more or less vortex creating grooves (stratifying grooves) may be desired. Typically this will depend on the relative dimensions of the grooves and diameter of the plug as well as the pressure or velocity of the mixture in the housing. The mixing occurs within void space 86 of housing 60 and creates a vortexing or tornado action. Plug 79 tapers as it proceeds from its distal end 81 to its proximal end 83. Thus, proximal end 83 is smaller in diameter than distal end 81. This provides additional space within void space 86 for the mixing of the hydrogen and air. The stratified hydrogen/air are twisting in a vortex fashion when leaving housing 60 via exit port 88. The vortexing action produced by grooves 84 on the plug 79 creates a "tornado" 110 of hydrogen/air with a hollow center that generates a vacuum. Similar effect would result were t he grooves to be placed on the housing. The vacuum propels the hydrogen/air mixture into the cylinder of the engine for combustion. Such mixing cannot be accomplished in a conventional induction system.

Referring now to FIG. 5, a schematic of the system of this invention is portrayed, with arrows representing gas flow. Hydrogen flows in through port 62 through adapter 38 and into cylinder 92. Air enters cylinder 92 through air intake 90 and air intake valve 91. The stratified hydrogen/air mixture is compressed in the compression stroke of the engine via piston 94 and push rod 96, which are standard structures in an internal combustion engine. In the power stroke shown in FIG. 5-C, a spark is generated in the compressed stratified hydrogen/air mixture ignites and drives piston 94 and push rod 96 to power the engine.

The mass energy density of hydrogen is enhanced through the increased pressure on the hydrogen exerted by piston 94 on the hydrogen/air mixture within the cylinder 92 in the uptake stroke in an internal combustion engine. The pressurized and well-mixed hydrogen/air mixture is rapidly ignited through the spark because hydrogen has a fast flame front. This reduces problems with timing. Thus, the energy store found in hydrogen is captured through this system via the compression of the hydrogen gas within cylinder 92 and via the thorough mixing of hydrogen and air provided by adapter 38.

In addition, in the exhaust phase in a four cycle engine a second spark is generated from the plug to ensure complete combustion of by-products. This is enhanced by using an electrode made of platinum. Exhaust leaves cylinder 92 through exhaust port 98. Exhaust port 98 is closed during other phases by exhaust outlet valve 100.

In the exhaust stroke, because air valve 91 is closed, the substantial component of the gases in cylinder 92 is hydrogen. This is also accomplished due to the fact that in the system of this invention, the hydrogen is continuously flowing. When this spark interacts with what is predominately hydrogen, a plasma is formed. This plasma blocks back-flow of air from exhaust port 98. Prevention of back-flow of air prevents the hydrogen fuel system from backfiring, which is another common problem of hydrogen fuel systems. In effect, then, the plasma formed by the hydrogen acts as a virtual valve in that the plasma blocks the back-flow of air.

When the plasma of the hydrogen is generated as described above, UV radiation is generated which also facilitates consumption of combustion by-products. This increases the environmental friendliness of the system.

In addition to hydrogen the following fuels can be used in this system: natural gas; alcohol; gasohol; propane and buthane. A mixture of hydrogen and natural gas can also be used. As noted above, gasoline can be used in this system when solenoid 26 is used to stop the flow of hydrogen.

Further, it is contemplated that an adapter that is described herein for use with an internal combustion engine can also be used with a home heating system such as a home heating system that may currently use natural gas. The vortexing action created by the plug would enable appropriate power to be captured from the hydrogen fuel so as to effectively heat a home.

Figure 7:
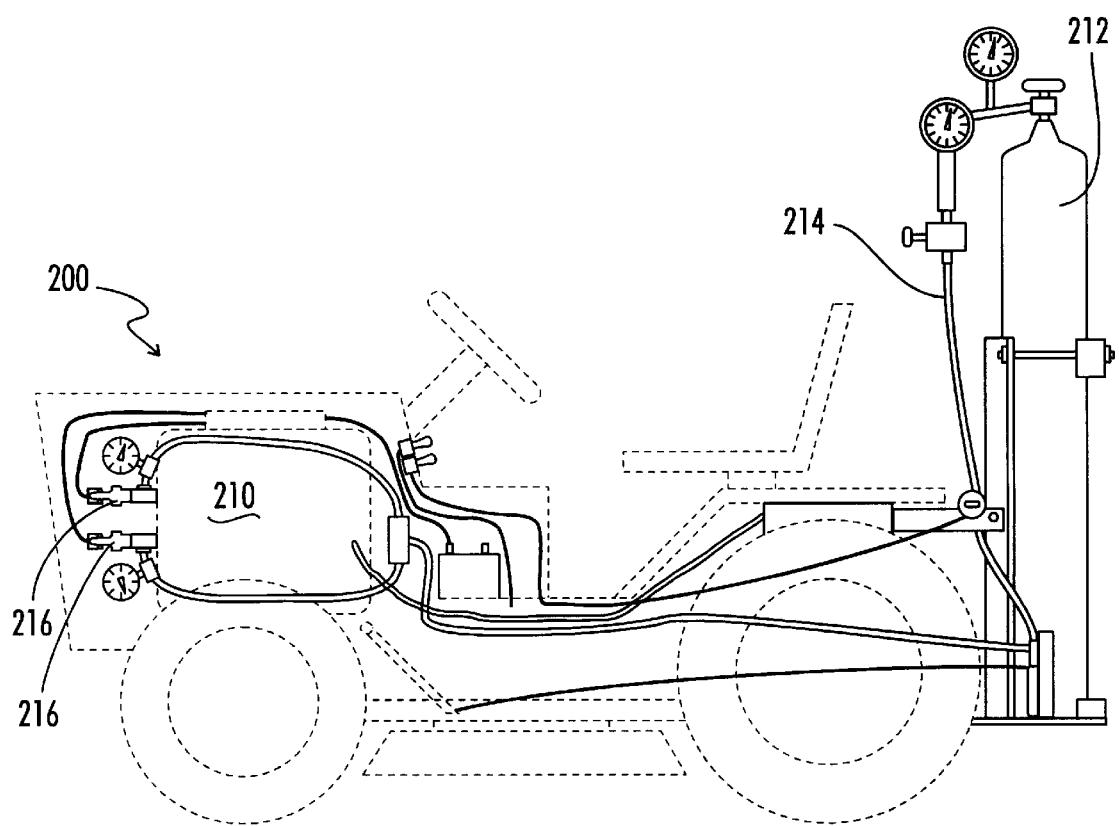
FIG. 7 shows a vehicle of the present invention utilizing hydrogen fuel.

Another embodiment of the invention is a hydrogen powered vehicle 200 shown in FIG. 7. The hydrogen powered vehicle 200 includes an internal combustion engine 210 operably connected to power the vehicle 200 and adapted to connect to a hydrogen supply 212 through a supply line 214.

Referring to FIG. 8, the internal combustion engine 210 comprises a cylinder 92 operably connected to the supply line 214. A piston 94 is operably disposed in the cylinder 92. A spark plug 216 having an electrode assembly 218 (not shown in FIG. 8) is in operable sparking communication with the cylinder 92, wherein the spark plug 216 is capable of producing a spark 220 (shown in FIG. 10) of at least 45 kilovolts. FIGS. 8–11 are substantially similar to FIGS. 5A–5D depicting schematic representations of a 4-cycle piston-cylinder engine. Other piston and cylinder embodiments will be apparent to those with skill in the art. FIG. 8 represents an intake stroke. FIG. 9 depicts a compression stroke. FIG. 10 depicts a power stroke, in which the spark plug 216 sparks. FIG. 11 depicts an exhaust stroke, where the spark plug 216 is sparking. Refer to FIGS. 5A–5D discussed earlier for further description of similar components of FIGS. 8–11.

Figure 12:
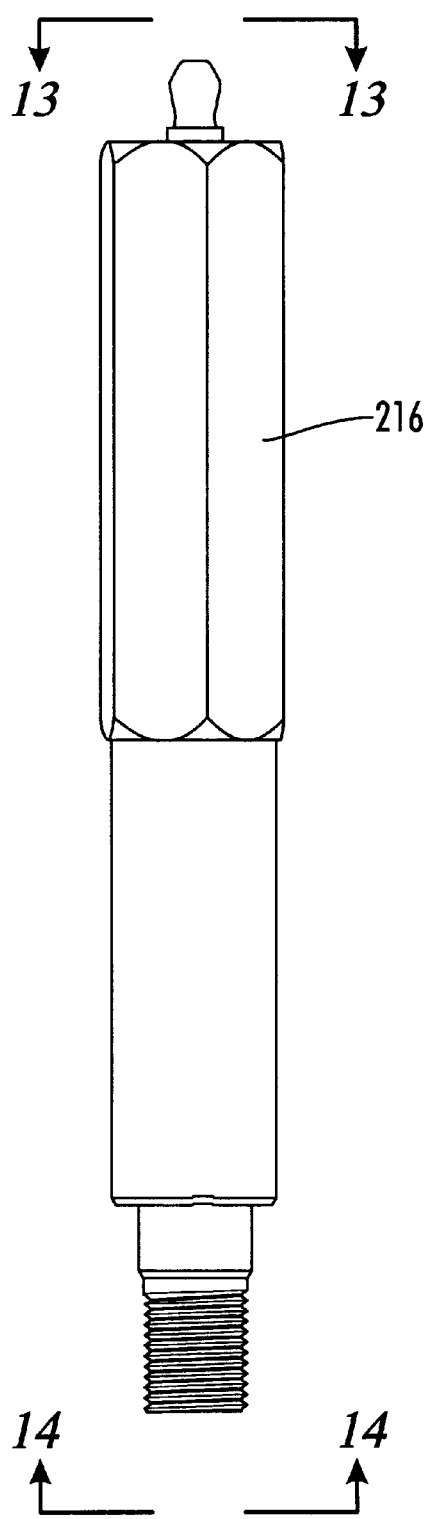
FIG. 12 shows an elevated side view of a spark plug of the present invention.
Figure 13:
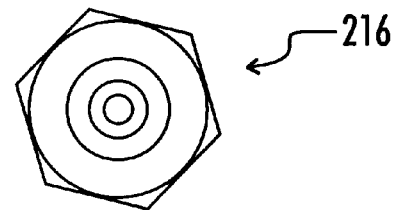
FIG. 13 shows a plan view in the direction of view line 13—13 of the spark plug shown in FIG. 12.
Figure 14:
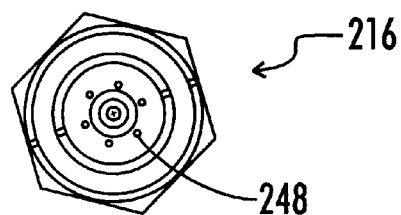
FIG. 14 depicts a plan view in the direction of view line 14—14 of the spark plug shown in FIG. 12.

FIG. 12 shows one embodiment of the spark plug 216 in an elevated side view. FIG. 13 shows a plan view of the spark plug 216 along line 13—13 shown in FIG. 12. FIG. 14 shows a plan view of the spark plug 216 in the direction of line 14—14 shown in FIG. 12.

FIG. 15 depicts a section view of the spark plug 216. FIG. 15, section view, depicts a representative spark plug 216. The spark plug shown in FIG. 15 comprises a housing 222 having a sparking end 224 and a hollow chamber 226 containing the electrode assembly 218.

FIG. 16 depicts the electrode assembly 218 removed from the hollow chamber 226. The electrode assembly 218 depicted in FIG. 16 comprises an electrode 228. The electrode 228 has a connector end 230 and a sparking end 232. As shown in FIG. 15 the sparking end 232 of the electrode 228 is positioned adjacent to the housing sparking end 224. The electrode assembly further comprises a coil 234 electrically connected to the electrode connector end 230.

Referring to FIGS. 10 and 11, wherein the piston 94 moves through a power stroke in FIG. 10 and an exhaust stroke in FIG. 11, the spark plug 216 is shown to fire during the power stroke and the exhaust stroke.

The electrode assembly 218 shown in FIG. 16 comprises a steel ball 236 positioned between the coil 234 and the electrode connector end 230. Other operable ball-coil-electrode arrangements will be apparent to those of skill in the art.

The spark plug 216 shown in FIG. 15 also comprises an insulator 238 surrounding the electrode assembly 218 and positioned in the hollow chamber 226. A ceramic pore 240 is shown stabilizing the insulator 238 in the hollow chamber 226. Other methods of locating the insulator in the hollow chamber will be apparent to those of skill in the art.

An elevated section view of the housing 222 is shown in FIG. 17. An elevated side view of the housing 222 is shown in FIG. 18. In the exemplary embodiment of the housing 222 shown in FIG. 18, the housing 222 comprises a fuel inlet port 242 in fluid communication with the supply line 214 (not shown). FIG. 19 depicts an exemplary embodiment of the insulator 238. The insulator 238, shown in FIG. 19, comprises an outer surface 244 defining a first fuel channel 246 having a first respective fuel exit port 248. The first fuel channel 246 is in fluid communication with the fuel inlet port 242. The fuel exit port 248 exits into the cylinder 292.

FIG. 20 shows a plan view of the insulator 228 shown in FIG. 19 along line 20—20. FIG. 21 shows a section view of the insulator 228 shown in FIG. 19 viewed along section line 21—21. FIG. 22 depicts a bottom plan view of the insulator 228 shown in FIG. 19 along line 22—22. FIG. 23 shows a section view of the insulator 228 cut through section line 23—23 shown in FIG. 19.

In the embodiment of the insulator 228 shown in FIGS. 19–22, the insulator outer surface 244 defines a plurality of fuel channels 250, including the first fuel channel 246. The fuel channels 250 include a plurality of respective fuel exit ports 252, including the first fuel exit port 248. This is shown clearly in FIG. 22. Preferably, the plurality of fuel channel exit ports 252 are spaced equally, or equi-distant, about the electrode 228. This is shown well in FIGS. 21 and 22.

Referring to FIGS. 15 and 17, one embodiment of the housing 222 sparking and 224 comprises a torridal ground electrode 254 positioned about the electrode sparking end 232 (shown in FIG. 15). Preferably the housing sparking end 224 and the electrode sparking end 232 are co-terminous. In one embodiment the first respective fuel exit port 248 is co-terminous with the housing sparking end 224 and the electrode sparking end 232.

More generally the present invention includes an internal combustion engine 210 adapted to operate on hydrogen fuel supplied through a supply line 214. Typically the engine comprises a first cylinder 92 in fluid communication with the supply line 214; a first piston 94 disposed in the first cylinder 92 to move through a power stroke and an exhaust stroke (See FIGS. 10 and 11) in the first cylinder 92. The engine 210 also comprises a spark plug 216 having a housing 222 including a sparking end 224 and an electrode assembly 218 located in the housing 222, wherein the sparking end 224 is in operable communication with the cylinder 92 and capable of producing a spark 220 of at least 45 kV. Preferably, the spark plug 216 fires during the power stroke and the exhaust stroke. In one embodiment the housing sparking end 224 comprises a torridal ground electrode 254. The electrode assembly 218 comprises an electrode 228 having a sparking end 230 capable of sparking toward the torridal ground electrode 254. Preferably the electrode assembly 218 comprises a coil 234 in electrical communication with the electrode 228.

In one embodiment the electrode assembly 218 comprises an electrode 228 having a sparking end 230 and a coil 234 electrically connected to the electrode 228 opposite the electrode sparking end 230. This is the embodiment shown in FIG. 15. Typically the spark plug 216 comprises an insulator 228 surrounding the electrode assembly 218. Preferably the insulator 228 includes a fuel channel 246 having a fuel exit port 248 near the electrode sparking end 232.

It will be apparent to those with skill in the art that the present invention also comprises a method of operating an internal combustion engine 210 comprising the steps of supplying hydrogen fuel to the engine 210; moving a piston 94 in a cylinder 92 through a power stroke and an exhaust stroke; creating a spark 220 in the cylinder 92 during the power stroke and the exhaust stroke, wherein the spark created during the power stroke is at least 45 kV; and supplying the fuel to a location sufficiently near the spark to ignite the fuel. This is shown well in FIGS. 10, 15 and 19.

The present invention also includes a method wherein the step of creating a spark 220 comprises passing an electric current (not shown) through an electrode assembly 218 including a coil 234 electrically connected to an electrode 218 having a sparking end 232; insulating the electrode assembly 218; and arcing the electric current from the electrode sparking end 232 to a ground electrode 254. The ground electrode 254 as shown in FIGS. 15 and 17 a toroidal ground electrode 254.

In certain embodiments the step of creating a spark 220 includes creating a spark 220 having at least 70 kV. Creating a spark of sufficient voltage will generally reduce the exhaust pollution. Typically this happens by generating a plasma or plasma field during the exhaust stroke. Thus, one method of the present invention further comprises the steps of generating plasma during the exhaust stroke; and allowing exhaust fuel converted to an exhaust state to coalesce with the plasma. This reduces exhaust pollution.

Thus, the apparatus and system of this invention provides an effective means to use alternative fuels. The use of alternative fuels can enhance the environment by reducing the use of conventional gasoline and the environmentally detrimental by-products caused by the consumption thereof.

Thus, although there have been described particular embodiments of the present invention of a new and useful "Hydrogen Powered Vehicle, Internal Combustion Engine, And Spark Plug For Use In Same", it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What is claimed is:

1. A hydrogen powered vehicle including an internal combustion engine operably connected to power the vehicle and adapted to connect to a hydrogen supply through a supply line, the internal combustion engine comprising:
   a cylinder operably connected to the supply line;
   a piston operably disposed in the cylinder;
   a spark plug having an electrode assembly in operable sparking communication with the cylinder, wherein the spark plug is capable of producing a spark of at least 45 kV, the spark plug including:
      a housing having a sparking end and hollow chamber, the housing including a fuel inlet port in fluid communication with the supply line;
      an electrode assembly, received in the hollow chamber and including an electrode having a connector end and a sparking end, the sparking end positioned near the housing sparking end;
      an insulator surrounding the electrode assembly and positioned in the hollow chamber,
      the insulator including an outer surface defining a first fuel channel having a first respective fuel exit port, wherein the first fuel channel is in fluid communication with the fuel inlet port and the fuel exit port exits in the cylinder.

2. The apparatus of claim 1, wherein the piston moves through a power stroke and an exhaust stroke in the cylinder, and the spark plug fires during the power stroke and the exhaust stroke.

3. The apparatus of claim 2, wherein:
   the spark plug comprises a housing having a sparking end and hollow chamber containing the electrode assembly; and
   the electrode assembly comprises an electrode having a connector end and a sparking end, the sparking end positioned adjacent to the housing sparking end and the electrode assembly further comprises a coil electrically connected to the electrode connector end.

4. The apparatus of claim 1, wherein the electrode assembly comprises a steel ball positioned between a coil and the electrode connector end.

5. The apparatus of claim 3, wherein the insulator outer surface defines a plurality of fuel channels, including the first fuel channel, wherein the fuel channels include a plurality of respective fuel exit ports, including the first respective fuel exit port.

6. The apparatus of claim 5, wherein the plurality of fuel channel exit ports are spaced equally about the electrode.

7. The apparatus of claim 6, wherein the housing sparking end comprises a toroidal ground electrode positioned about the electrode sparking end, and wherein the housing sparking end and the electrode sparking end are co-terminous.

8. The apparatus of claim 7, wherein the housing sparking end comprises a toroidal ground electrode positioned about the electrode sparking end, and wherein the housing sparking end, the electrode sparking end, and the first respective fuel exit port are co-terminous.

9. An internal combustion engine adapted to operate on hydrogen fuel supplied through a supply line, the engine comprising:
   a first cylinder in fluid communication with the supply line;
   a first piston operably disposed in the first cylinder to move through a power stroke and an exhaust stroke in the first cylinder;
   a spark plug having housing including a sparking end, and an electrode assembly located in the housing, wherein the sparking end is in operable communication with the cylinder and capable of producing a spark of at least 45 kV; and wherein
      the spark plug fires during the power stroke and the exhaust stroke;
      the spark plus comprises an insulator located in the housing around the electrode assembly;
      the housing comprises a fuel inlet port in fluid communication with the supply line; and
      the insulator includes a first fuel channel in fluid communication with the fuel inlet port, the first fuel channel having a respective first fuel exit port exiting into the cylinder.

10. The device of claim 9, wherein the housing sparking end comprises a toroidal ground electrode, and wherein the electrode assembly comprises an electrode having a sparking end capable of sparking toward the toroidal ground electrode.

11. The device of claim 10, wherein the electrode assembly comprises a coil in electrical communication with electrode.

12. The device of claim 11, wherein the electrode sparking end, the toroidal ground electrode, and the first respective fuel exit port are co-terminus.

13. The device of claim 12, wherein:

the electrode assembly comprises an electrode having a sparking end, and a coil electrically connected to the electrode opposite the electrode sparking end.

* * * * *